(12) United States Patent
Scharfenort et al.

(10) Patent No.: US 10,022,943 B2
(45) Date of Patent: Jul. 17, 2018

(54) PACKAGE MATERIAL BLANK AND METHOD OF FORMING THE SAME

(71) Applicant: Tetra Laval Holdings & Finance S.A., Pully (CH)

(72) Inventors: Per Scharfenort, Furulund (SE); Bengt Håkansson, Sjöbo (SE); Therese Eklund, Lund (SE); Claudia Leidinger, Malmö (SE); Karin Marcoveccchio, Lund (SE); Carl Nordenskjöld, Malmö (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 15/109,384

(22) PCT Filed: Nov. 26, 2014

(86) PCT No.: PCT/EP2014/075657
§ 371 (c)(1),
(2) Date: Jun. 30, 2016

(87) PCT Pub. No.: WO2015/101447
PCT Pub. Date: Jul. 9, 2015

(65) Prior Publication Data
US 2016/0325533 A1    Nov. 10, 2016

(30) Foreign Application Priority Data

Dec. 30, 2013  (EP) ..................................... 13199808
Jun. 19, 2014  (SE) ..................................... 1450771-9

(51) Int. Cl.
*B32B 27/10*        (2006.01)
*B65D 5/42*         (2006.01)
(Continued)

(52) U.S. Cl.
CPC ............ *B32B 27/10* (2013.01); *B65D 5/0281* (2013.01); *B65D 5/065* (2013.01); *B65D 5/40* (2013.01);
(Continued)

(58) Field of Classification Search
CPC ...... B65D 5/4266; B65D 5/0281; B65D 5/40; B65D 5/065; B65D 5/745
(Continued)

(56) References Cited

U.S. PATENT DOCUMENTS 2,323,505 A * 7/1943 Wilcox .................. B65D 5/741
                                                  222/528
2,475,677 A    7/1949 Ringler
(Continued)

FOREIGN PATENT DOCUMENTS

FR    1 426 707 A    1/1966
FR    2 535 685 A    5/1984
(Continued)

OTHER PUBLICATIONS

International Search Report (PCT/ISA/210) dated Feb. 19, 2015, by the Japanese Patent Office as the International Searching Authority for International Application No. PCT/EP2014/075657.
(Continued)

*Primary Examiner* — Christopher Demeree
(74) *Attorney, Agent, or Firm* — Buchanan Ingersoll & Rooney PC

(57) ABSTRACT

A package material blank comprises a body panel having a main panel, two second panels arranged adjacent to the main panel and at least one third panel. End closure panels arranged adjacent to the body panel, the end closure panels comprising a top and bottom closure panels arranged adjacent to the main and the at least one third panel, respectively and flap closure panels arranged adjacent to the two second
(Continued)

panels. Lines of weakness separate each of the body and end closure panels. A line of weakness is provided on the main panel having a first portion and a second portion, wherein the first portion extends from a first point to a second point and the second portion extend from a third point to the second point.

21 Claims, 3 Drawing Sheets

(51) Int. Cl.
    *B65D 5/06* (2006.01)
    *B65D 5/40* (2006.01)
    *B65D 5/74* (2006.01)
    *B65D 5/02* (2006.01)

(52) U.S. Cl.
    CPC .......... *B65D 5/4266* (2013.01); *B65D 5/745* (2013.01); *B32B 2439/62* (2013.01); *B32B 2439/70* (2013.01)

(58) Field of Classification Search
    USPC .................... 229/240, 242, 243, 244, 123
    See application file for complete search history.

(56) References Cited

U.S. PATENT DOCUMENTS

| | | | |
|---|---|---|---|
| 3,367,553 A | 2/1968 | Francis | |
| 3,981,430 A | 9/1976 | Keim | |
| 3,982,683 A * | 9/1976 | Forteau | B65D 5/745 229/215 |
| 4,621,736 A | 11/1986 | Roccaforte | |
| 4,691,858 A | 9/1987 | Peer, Jr. | |
| 5,203,634 A | 4/1993 | Kim | |
| 5,595,340 A * | 1/1997 | Skinner | B65D 5/065 229/207 |
| 7,032,810 B2 * | 4/2006 | Benedetti | B65D 77/32 229/125.15 |
| 8,052,038 B2 * | 11/2011 | Jackson | B65D 3/261 229/123 |
| 2005/0274086 A1 * | 12/2005 | Petrelli | B65D 5/745 53/410 |
| 2006/0255107 A1 | 11/2006 | Wright | |
| 2008/0000953 A1 * | 1/2008 | Jones | B65D 5/745 229/122.1 |
| 2008/0135605 A1 | 6/2008 | Manaige | |
| 2010/0282829 A1 | 11/2010 | Jackson | |

FOREIGN PATENT DOCUMENTS

| | | |
|---|---|---|
| GB | 1 118 696 A | 7/1968 |
| GB | 1 228 764 A | 4/1971 |
| GB | 2 311 771 A | 10/1997 |
| GB | 2 320 709 A | 7/1998 |
| JP | H-08 253238 A | 10/1996 |
| NL | 2001645 C2 | 12/2009 |
| WO | WO 2011/084074 A1 | 7/2011 |

OTHER PUBLICATIONS

Written Opinion (PCT/ISA/237) dated Feb. 19, 2015, by the Japanese Patent Office as the International Searching Authority for International Application No. PCT/EP2014/075657.

International-Type Search Report (Form ITS 201) dated Jan. 15, 2015, by the Swedish Patent Office as the International Searching Authority for International Application No. ITS/SE14/00150.

Jinye Huang et al., "Paper Packaging Structure Design Handbook", Shanghai Far East Press, Jan. 1993, pp. 134-136.

Chinese Office Action issued by the Chinese Patent Office on Mar. 14, 2018 in corresponding Chinese Patent Application No. 201480071471.X, with English translation (14 pages).

* cited by examiner

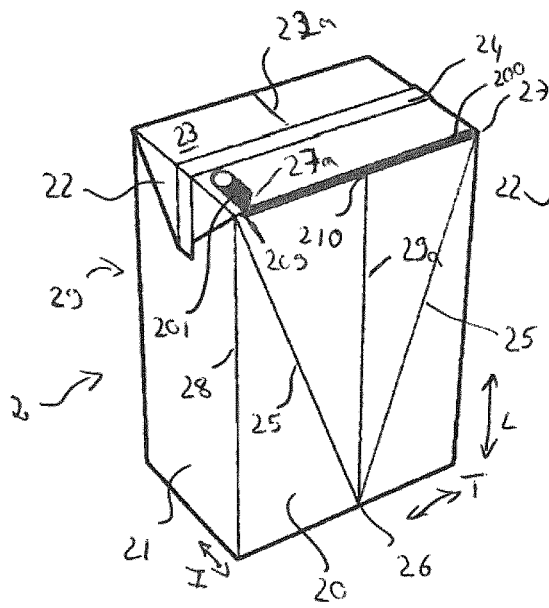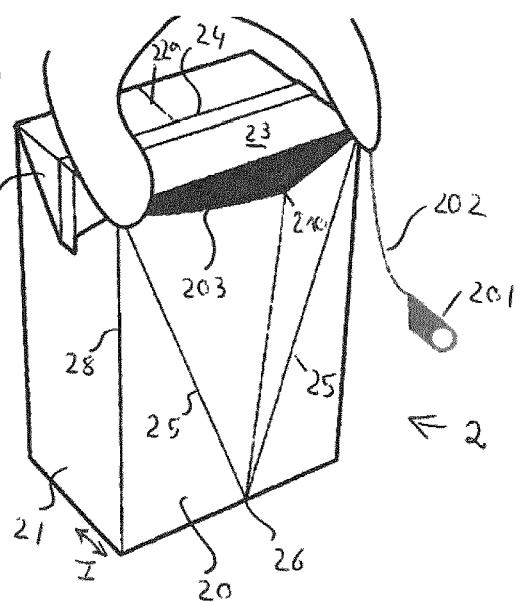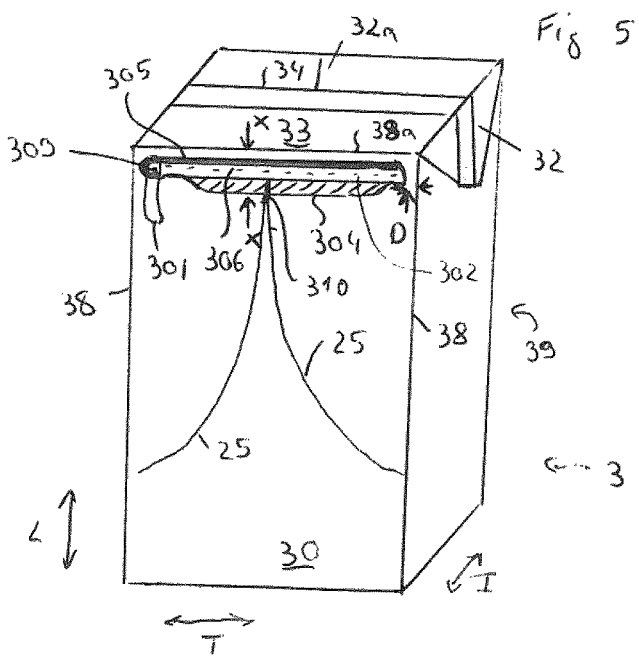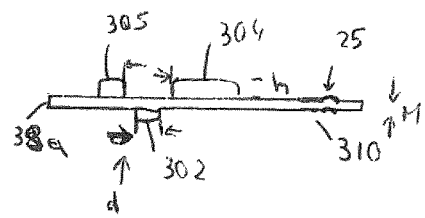

PACKAGE MATERIAL BLANK AND METHOD OF FORMING THE SAME

The present invention relates to a package material blank and to a method of forming a package material blank.

BACKGROUND OF THE INVENTION

Consumable liquid food products are often sold in packages made of sterilized packaging material. Typical examples for such packages include the Tetra Brik® Aseptic in the shape of a brick stone.

The packaging material used for those packages comprises a multilayer structure. One or more layers of plastics, and aluminum foil (depending on the package type) are laminated on both sides of a card board of paperboard layer, the latter having different stiffness, strength and thicknesses depending on the package type.

Packages of this sort are normally produced on fully automatic packaging machines, on which a continuous tube is formed from the web-fed packaging material; the packaging material is sterilized inside the packaging machine, e.g. by radiating the web using a low voltage electron beam or a chemical sterilization agent. The material is then folded in a sterile environment and sealed longitudinally to form a vertical tube.

The tube is filled with the sterilized or sterile-processed food product, is sealed transversally and subsequently cut along equally spaced cross sections to form parallelepiped-shaped packages like the above mentioned package.

To open the packages described above, various solutions have been proposed. In patent application WO2009000927, by the present applicant, an alternative opening device is presented. In that application a spout and a corresponding membrane is injection molded in the same molding step, directly onto a sheet of packaging material.

Despite the variances of opening for the different packages, there is still a need for further variances, particularly for high pouring speed, but also with reduced material consumption and production time.

SUMMARY OF THE INVENTION

For the purpose of the invention, the terms container, package and package container refer to the same structure. In addition, the terms material, material laminate structure or package material refers to the package material laminate structure used in the package container.

Likewise, package material blank, blank or package blank refer to the same structure. Further a package material web comprises a plurality of such blanks, just connected to one after the other. Cutting the web provides individual blanks. For the purpose of the invention, a package material blank may be an individual sheet or part of a package material web.

The terms "arranged on" shall include the literal meaning but shall also comprise "arranged adjacent to" or "arranged close to" to the extent that the feature has the same impact for its desired purpose as the feature which is "arranged on".

The invention proposes to provide additional lines of weakness on the main panel to support a funnel shape opening when the package is open. The additional lines of weakness or crease lines on the main panel enable a very fast pouring experience as the created opening may be significant enlarged compared to conventional openings on the top of the package. In addition, an opening along a substantial portion of the package width is created.

In an embodiment, a package material blank comprises a main panel, two side panels arranged on different sides adjacent to the main panel and at least one third panel, arranged adjacent to one of the side panels. Those panels are therefore arranged in a row. Further the blank comprise end closure panels, which are arranged adjacent to the upper and lower portion of the row of previous panels. The blank therefore comprise a stack of panels, namely a lower end closure panel, the row of panels including the main panel and then an upper end closure panel. In the embodiment, the end closure panels comprises a top and bottom closure panels arranged adjacent to the main and the at least one third panel, respectively and flap closure panels arranged adjacent to the two side panels;

For folding the blank to create a package, the different panels are separated by respective line of weaknesses. Those lines of weaknesses may be crease lines and facilitate the folding of the blank into a package container.

In accordance with the invention, a further line of weakness on the main panel comprises a first portion and a second portion, wherein the first portion extends from a first point to a second point and the second portion extend from a third point to the second point.

Said line of weakness with its two portion enables the first side to bend into a funnel-shape like opening and particular increases the size of an opening.

Several different shapes, starting and end point can be used to facilitate an increased opening. In an embodiment the first and second portion are symmetrical with respect to a center axis of the main panel. In other words the first portion can be mirrored on a center axis of the main panel to resemble the second portion.

In an embodiment, the second point is arranged on a central axis of the main panel, thereby achieving some symmetry on the front side of the package when the package container is opened. Alternatively or in addition, the second point may be arranged close to, adjacent to or on a transversal line of weakness separating the main panel from the bottom closure panel, i.e. the bottom transversal crease line. A smaller opening will be achieved, when the second point is arranged close or on the centre of main side. Alternatively, the second point may be arranged in an embodiment adjacent to or on the line of weakness between the main panel and the top closure panel. This will result a different shape of the opening.

Consequently, the starting or ending point, respectively of the first and second portion may be arranged on the longitudinal lines of weakness separating the main panel and the respective side panels. In an embodiment, the first and third point are arranged on, adjacent to or close to each of the corners defined by the main panel, the top closure panel and the respective side panels. In such embodiment, the second point may be arranged on a central axis of the main panel, preferable in the bottom of the main panel and for example on the bottom closure panel. Alternatively, the second and third point may be arranged on, adjacent to or close to each of the corners defined by the main panel, the bottom closure panel and the respective side panels. In an alternative embodiment, the first and second point may coincide with the end points of the opening device arranged on the main panel.

Another aspect of the invention is related to the preparation of the opening. In an embodiment, the package material blank comprise a weakened area, which comprises a reduced thickness compared to a surrounding area of the package material laminate structure. The weakened area may for instance lack the cellulosic material or the carton board layer, normally present in the multilayer structure. The weakened area s used to apply the opening in a later processing step of the package material blank. The weakened area may be arranged on the main panel, preferable adjacent to the line of weakness between the main panel and the top closure panel. It can be also arranged on the line of weakness itself. In such embodiment the applied opening device enables to open the package along the main side above the level of liquid. Alternatively it can be arranged on the top closure panel adjacent to the line of weakness between the main panel and the top closure panel. In such embodiment the edge of the top closure panel, that is the line of weakness may provide a pouring support. In an embodiment, the first point of the line of weakness is intersecting with the weakened area.

A further aspect of the invention is related to the opening device. In an embodiment, the package material blank comprises an opening device having a tab portion to open the package made from the blank. An opening strip portion is attached to the material of blank on a surface opposite the tab portion. In other word, the tab portion is attached on a first surface, forming an outer surface of the package container made from the blank, while the opening strip portion is arranged on the second surface forming the inner surface of the later package container. The opening strip portion is elongated and extends substantially parallel to the line of weakness separating the main panel from the top closure panel. In accordance with the embodiment, a bridge penetrating through the weakened area connects the tab portion to the opening strip portion.

In an embodiment, the opening device is made of plastic material and applied to the blank before forming the container by molding or similar techniques.

The elongated opening strip portion creates an elongated opening above the liquid level and close to the line of weakness between the main panel and the top closure panel. The elongated is significantly increased by the line of weakness on the main panel forming a funnel-shaped opening upon exertion of pressure on side walls of the container.

In an embodiment, the opening device further comprises a support portion extending substantially parallel to the opening strip portion and in some embodiments surrounding the area covered by the opening strip portion. The support portion may be arranged close to the line of weakness and may in some embodiment also comprise a centrally arranged recess or weakness to facilitate the bending of the main panel upon exertion of pressure. The support portion may extend over a substantive portion of the width of the main panel. In an embodiment, the opening strip portion and/or the support portion may comprise between 60 and 95% of the width of the main panel.

DESCRIPTION OF THE DRAWING

The invention will be now described in more detail with reference to the accompanying drawings, illustrating several aspects and embodiments of the invention.

FIG. 3 illustrates a brick-like package using an embodiment of a blank according to the present invention;

FIG. 4 shows the embodiment of FIG. 3 in an open state;

FIG. 5, illustrates brick-like package made from an embodiment of a blank according to the present invention;

FIG. 5A illustrates a respective cut-view along the axis X-X of the embodiment of FIG. 5;

Figure 2:
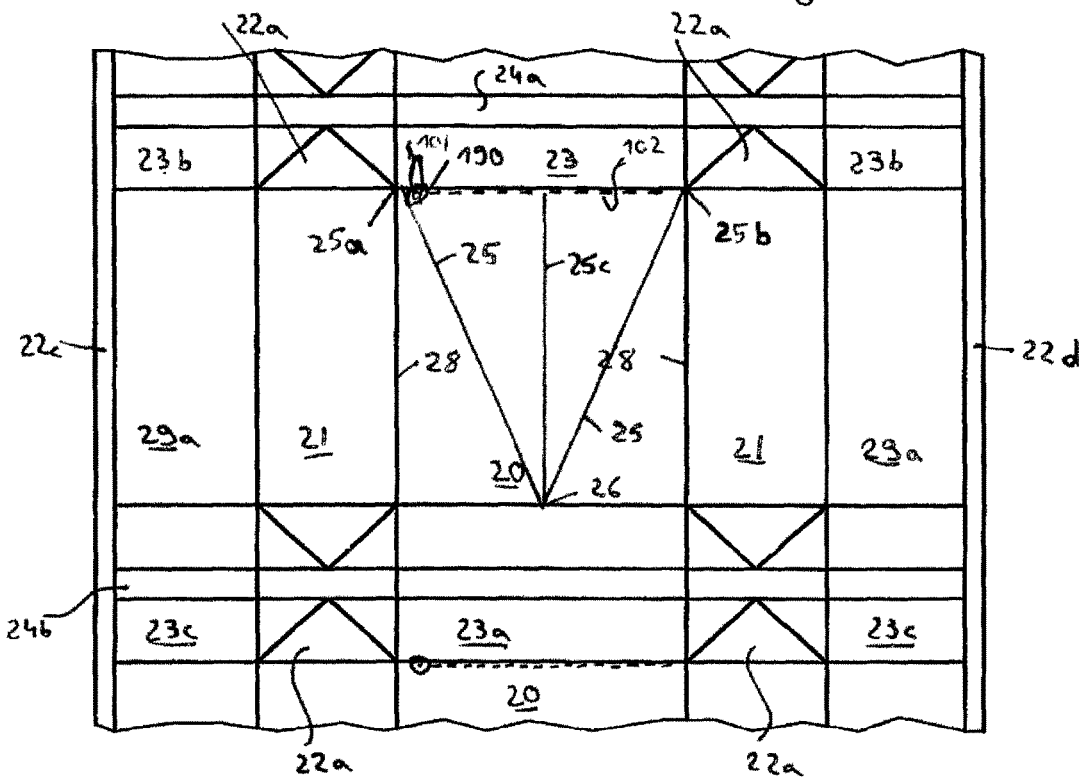
FIG. 2 shows a first embodiment of a package material blank on a package material web according to the invention.

Similar features in the drawings bear similar reference signs. It should be noted that the features in the different embodiments can of course be combined by a skilled person to form yet another alternative without deviating from the inventive concept.

DETAILED DESCRIPTION

Figure 1:
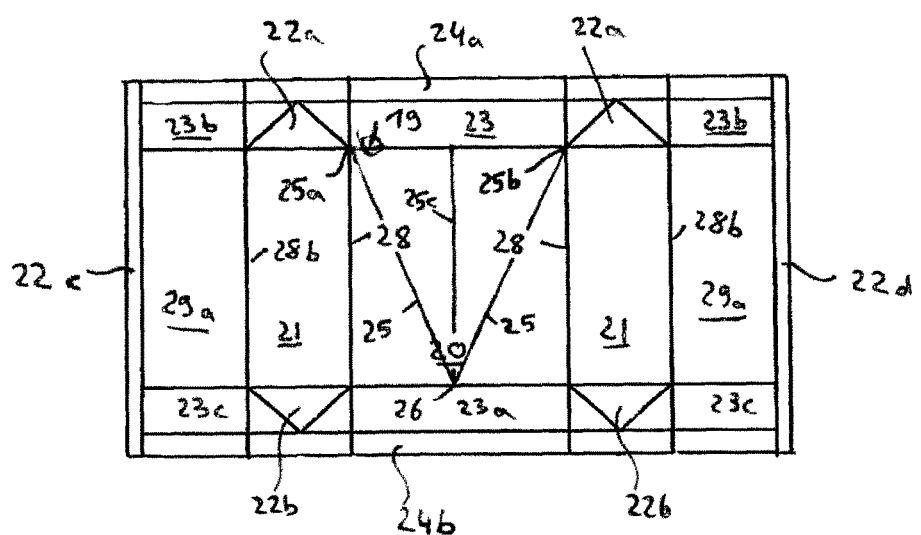
FIG. 1 shows a first embodiment of a package material blank according to the invention.

FIG. 1 shows an embodiment of a blank of package material according to the present invention. The package material blank comprises several body panels 20, 21 and 29a. Two side panels 21 arranged on respective sides of a main panel 20. Crease lines 28 extending in the longitudinal direction are separating main panel 20 from the two side panels 21. The term crease line refers to a line of weakness, in which the structure of the package material laminate is changed compared to the surrounding structure. For instance, a crease line can be manufactures by crushing part of the material structure, i.e. fibers in the carton board.

Portions of a back panel 29a are arranged adjacent to side panels 21. Crease lines 28b extending from the top to the bottom of the blank are separating the back panels 29a from the side panels. When forming the package, the back panel portions 29a are sealed together using a longitudinal seal portion 22c. Said portions overlap after folding and are glued together using a longitudinal seal.

The blank also comprises end closure panels arranged on the top and bottom portion of the body panels. The end closure panels are separated from the body panels by a crease lines extending in the transversal direction and substantially perpendicular to the crease lines 28 and 28b. Consequently these crease lines are referred to a transversal crease lines. A top closure panel 23 is arranged on top of main panel 20 and another top closure panel 23b is arranged portion-wise on top of pack panel portion 29a. Likewise, bottom closure panels 23a and 23c are arranged adjacent to main panel 20 and back panel portions 29a, respectively. Finally, flap panel portions 22a and 22b are arranged on the side panels 21. The crease line separating the main panel from the top closure panels is referred to as upper transversal crease line, the crease line separating the main panel from the bottom closure panel is referred to a lower transversal crease line. When folding the package, the flap panel portions 22a are folded onto the side panels, while flap panel portions 22b are folded on the bottom closure portion 23a, 23c.

The blank according to the present invention also comprises a weakened area 109 arranged partly on the top closure panel 23 and the main panel 20 close to corner 25a. Hence, it covers part of the crease line separating top panel 23 from main panel 20. In the embodiment, the weakened area 19 is arranged adjacent to the longitudinal crease line 28 separating main panel 20 from side panel 21 and the top panel 23 from one of the flap panel portion 22a.

The weakened area 19 comprises a laminate structure, which is thinner than the remaining package material structure. For instance, the weakened area may comprise one or more layers less than the remaining package material structure. More particular, the weakened area may lack the carton or fiber board layer, which is otherwise present in the layer structure of the remaining blank. Consequently, said weakened area can be penetrated more easily than other areas of the blank to create an opening. The weakened area 19 can be created during the manufacturing process of the blank, by for instance punching a hole through the carton based layer and then laminating the carton based layer, thereby covering the punched hole. A skilled person is aware of several techniques to provide such weakened area on the desired spot in the upper portion of the main panel or in the top closure portion close to the crease line.

The main panel 20 further comprises another crease line 25 with a first portion and a second portion. The first portion of crease line 25 extends from the corner 25a to a point 26 centrally arranged on the lower transversal crease line separating the main panel form the bottom closure panel. The second portion of crease line 25 extends from corner 25c to point 26. Thereby point 26 forms a common intersection between the first and the second portion of the crease line and the lower transversal crease line. Crease line 25 forms a triangle together with the upper transversal crease. A further crease line 25c is arranged centrally on the main panel (one can say it divides the main panel into two sections) and extends from a center in the upper transversal crease line to the common intersection 26.

FIG. 2 shows another embodiment of the present invention in a further manufacturing step, slightly different to the embodiment of FIG. 1. The blank of FIG. 2 is part of a packaging web, in which a plurality of blanks is rolled onto a reel following one another. Separating the web along a line in the middle of crease line 24a and 24b, respectively, provides individual blanks. In FIG. 2, the weakened area 190 is arranged on the main panel close to the corner 25a and adjacent to the crease line separating main panel 20 from top panel portion 23. An opening device is molded onto the blank.

Said opening device comprises a tab portion 101 made of plastic material. Tab portion 101 is molded through a material bridge in the weakened area 190 to an opening strip portion 102 on the other side of the blank (indicated in FIG. 2 by the dotted line). Opening strip portion 102 is made of plastic and extends as an elongated strip substantially parallel to the crease line towards corner 25b. In other words, opening strip 102 substantially extend from close to corner 25a close to corner 25b. Said opening strip portion determines a preferred rupture line, when the tab 190 is pulled from corner 25a towards corner 25b, or more general from one side to the other side of the package.

After folding the package into its final shape, the crease lines 25 and 25c remains unfolded. When opening the package substantially parallel to the upper crease line separating main panel 20 from top panel portion 23 as described above, the crease lines 25 and 25c can facilitate a funnel shaped opening for an improved pouring.

FIGS. 3 and 4 illustrate the first embodiment according to the invention after folding and sealing it into a brick-like package container 2. Container 2 comprises a front wall 20, two sidewalls 21 and a back wall 29. Flaps 22 are arranged on the sidewall by folding them after the top portion 23 of the package container is transversally sealed. The transversal seal 24 is folded such that it faces the front wall 20. Likewise flaps are arranged on the bottom of the package (not shown). A longitudinal seal 22a is provided on the bottom side of the package container.

The container 2 further includes an opening device 200 arranged on an edge separating the front wall 20 from the top portion 23. The opening device extends from an upper outside corner 27 of the package container along substantially the whole width in the transversal direction T to a weakened area 209 close to the other upper corner and the edge 28. Two support strips extend along the width of the package, a first one on the top portion of the package container, right adjacent to the edge, and a second support strip 203 on the front wall adjacent to the edge. The two strips thereby enclose the edge of the package container separating front wall 20 from top portion 23. The opening device comprises a tab 201 in the shape of a pull tab of a zipper like-alike, which is flatly arranged on the top portion 23. Tab 201 is connected via a material bridge to an opening strip portion (not shown) arranged on the inside of the package along the edge to corner 27.

The package container further comprises two crease lines 25 extending from the upper corners 27 and 27a to a common center point 26 on the lower edge of the package. A central crease line 29a extends from a central point 210 on the upper edge down to the common central point 26.

The open configuration of the package is illustrated in FIG. 4. The opening strip portion 202 arranged on the inner surface of wall 20 has ruptured the material and created a small elongated opening. By exerting pressure on the sidewalls, the crease lines 25 and 29a fold to provide a V-shaped opening to facilitate the pouring. Support strip 203 stabilizes the opening and comprises a small weakening in the area 210 for a better bending or folding. The top portion in this embodiment remains flat, but it may bend up-wards or downwards, depending on the folding of the transversal seal 24.

FIG. 5 shows yet another embodiment of the inventive concept. Package container 3 is of brick like shape with its top seal 34 being folded not facing the front side. The longitudinal seal 32a is arranged on the top, the bottom and the back side of container 3. Container 3 comprises a different opening device on its front side 30. A tab 301 arranged on the front side 30 is connected in a circular weakened area 309 to an opening strip portion 302 arranged on an inner surface of front side. The opening strip portion extends substantially parallel to upper edge 38a from about one edge 38 to the about other edge 38 of the package container. A small distance D is between the opening strip portion and the respective edges 38.

On the outer surface of front side 30, two support portions 305 and 306 are arranged. The support portions include the weakened area 309 and surround said area and the entire opening strip portion on the inner surface being area 306. Support portion 305 comprises an elongated strip extending parallel between the upper edge 38a and the opening strip portion. Second support portion 306 comprises a first part with increased thickness (referring to the dimension into the longitudinal direction), arranged centrally and two adjacent small portions of about the same thickness as support portion 305. Bridge portions connect both support portions 304 and 305. A transition between the thick central area and the thinner adjacent area is S-shaped, but other shapes, can be used as well. The central thick area improves the pouring functionality after the package container has been opened. It hence may act as pouring support. The lower support 304 comprises a centrally arranged small recess 310 which acts as a bending point. The recess is aligned with two crease lines 25 extending from said recess two the longitudinal edges 38 in a curve shaped manner. They intersect at about a third of the height of the package. When opening the package exerting pressure the front side 30 bends forward, as does the top portion due to the folding of the top transversal seal, thereby creating a funnel-shaped big opening.

In the embodiment of FIG. 5, the opening strip portion in area 306 on the inner surface extends about 90% of the packaging container width. As it is slightly spaced from the upper edge 38a, it is possible to extend the opening strip portion around longitudinal edges 38 and onto the sidewall(s) of the container. Consequently, the weakened area is arranged on a sidewall of the package close the longitudinal edge, with the opening strip portion extending around the edge, along the main panel and to the other sidewall.

FIG. 5A illustrates a cut view through the axis X-X of FIG. 5. Starting from upper edge 38a, the support portion 306 as a thin strip is arranged on the outer surface of first wall 30. The opening strip portion 302 is arranged on the inner surface of in a longitudinal distance d form the support portion 305. Said distance d might be smaller than a thickness M of the material laminate structure of the front side. For example it may be as small as 0.1 to 0.5 times the thickness of material M. A small longitudinal distance between the support portions 304, 305 on the outer surface and the opening strip portion on the inner surface may improve the opening process, as it facilitates a pre-determined rupturing line. The height h of the support portions is higher than the height of the opening strip line 302.

Figure 6:
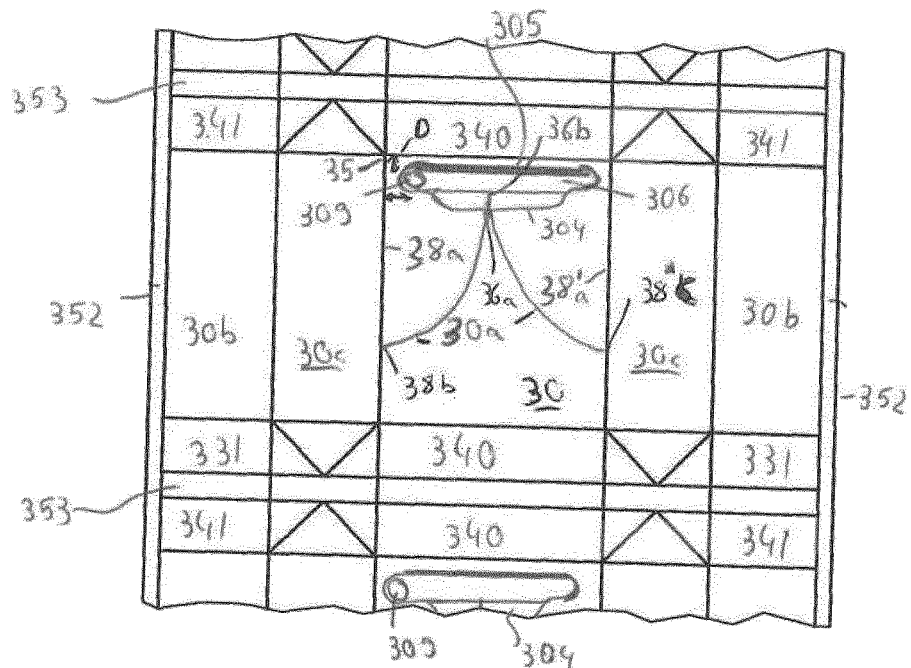
FIG. 6 shows another embodiment of a blank made on a package material web.

FIG. 6 shows another embodiment of a processed blank according to the present invention, the blank being part of a package material web. The blank can be used to create a package similar to the embodiment of the container shown in FIG. 5.

The blank is of similar structure as the blanks already described in FIGS. 1 and 2. The major difference is in the opening device attached to the blank as well as the crease line in the main panel of the blank. The main panel 30, comprises a crease line having two portions 30a. The first portion starts from a point 38b, which is lying adjacent to or on the longitudinal crease line 38a at about a third of the total length of said crease line 38 measured from the bottom closure panel 340. The portion is curved and ends at 36a at a molded support portion 304 described later herein. The second portion of the crease line starts at point 38c on crease line 38' a at the same distance from the bottom closure panel 340. The distance from the bottom panel 340 is selected such as to provide an opening of the upper portions of main panel 30 enclosed by the crease lines 38a, 38' a between points 38b and 38c and the top panel portion.

The processed blank also comprises a weakened area 309, on which an opening device is arranged. The weakened area 309 is arranged close to the upper left corner 35 with a distance D from the upper transversal crease line and a distance d from the longitudinal crease line. Both distances can be equal. Distance D is chosen such that the created opening after using the opening device is above a level of liquid filled in the container. The opening device contains a tab portion (not shown) with a material bridge through the weakened area and connected to an elongated opening strip on the other side of the package material blank. The opening strip extends along an area 306 substantially parallel to the upper transversal crease line. Area 306 is surrounded by a support portion of the opening device. The support portion comprises a first portion 305 extended between area 306 and the upper transversal crease line. First portion 305 is a relatively thin plastic line attached on the upper surface of the blank's main panel 30. The second portion 304 is molded onto the main panel between area 306 an the lower transversal crease line. The second portion comprises a central area having a higher thickness than the end elements of second portion 304. First and second portion are via two bridges completely surround area 306 and can therefore support the opening procedure, as they may define the direction in which the package is opened and also determine the end point of the opening.

The support portion 305 comprises a small central recess 36b which extends into the crease line 30a at point 36 After opening the package made from such blank, a user may exert pressure on the then sidewalls 30c which causes support portion 304 to bend in recess 305 thereby creating a funnel like opening of main panel 30.

In the alternative embodiment as described above, the area 306, under which the strip portion is attached to extends of the entire width of main panel 30 and partly into the side panels 30c. the support portion however extend as strips only over the width of the main panel, and are open on the end side, so the support portion does not completely surround area 306 as shown in FIG. 6. In fact support portion 304 may just comprise two strips one above and one below area 306. Weakened area 309 may be arranged on the sidewall and the opening strip on the inner surface extends at least over crease line 38a. In such embodiment the line of weakness may also extend over the respective longitudinal crease lines 38a and 38'a and into sidewalls 30c. Respective first and third point are then placed on the longitudinal lines of weaknesses.

Figure 7:
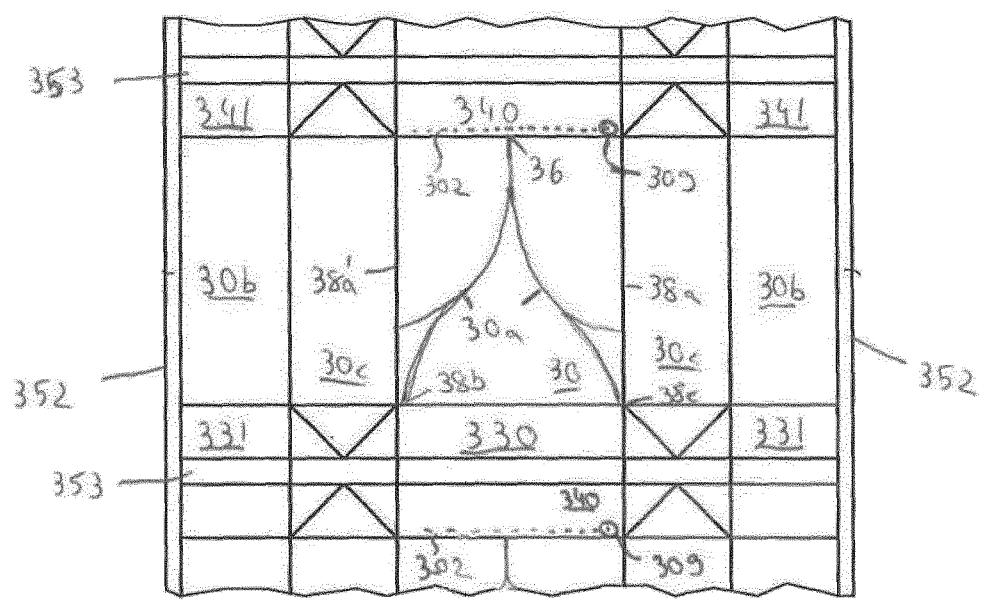
FIG. 7 illustrates yet another embodiment of a blank made on a package material web.

FIG. 7 illustrates another embodiment of a blank in a web according to the present invention. The crease line 30a with its two portion extends centrally form pint 36a on the upper transversal crease line in an s-shaped manner to the corners 38b and 38c, respectively. The weakened area is in this embodiment not arranged on the main panel, but on the top closure panel 340. Consequently, an opening device (not shown) will be arranged on the top closure panel 304 with its opening strip portion adjacent to the upper transversal crease line as indicated by the dotted line.

Although the embodiment illustrate a crease line with several portions starting or ending on a point placed adjacent to or on one of the blank crease lines, it should be noted, that the crease line on the main panel is selected such as to provide an opening. Consequently another crease line structure on the main panel is also possible. For instance the crease line can be structured as to form a "V" with its lower intersection point on the main panel and the top ends close to an opening. Also the shapes and curvature of the crease lines can be different and follow also aesthetical aspects, as there are any variances to form a bulge and a respective funnel shaped opening.

The invention claimed is:

1. Package material blank comprising a multilayer material structure having a layer of cellulosic material and one or more layers of plastic laminate, the package material blank comprising:
    a body panel having a main panel, two side panels arranged on different sides adjacent to the main panel, and at least one third panel arranged adjacent to one of the side panels;
    end closure panels arranged adjacent to the body panel, the end closure panels comprising a top closure panel and a bottom closure panel arranged adjacent to the main panel and the at least one third panel, respectively and flap closure panels arranged adjacent to the two side panels;
    respective lines of weakness between each panel of the body panel and the end closure panels for folding the panels along said lines of weakness;
    a line of weakness on the main panel having a first portion and a second portion, wherein the first portion extends from a first point to a second point and the second portion extends from a third point to the second point; and an opening device having:
   a tab arranged on a first surface of the blank;
   an elongated opening strip arranged on a second surface opposite the first surface;
   the tab being connected to the opening strip portion via a bridge penetrating through the multilayer material structure in the weakened area;
   the opening strip being substantially parallel to the line of weakness between the main panel and the top closure panel; and
   ends of the opening strip being respectively arranged adjacent to first and third points of the line of weakness between the main panel and the top closure panel.

2. The package material blank of claim 1, wherein the second point is arranged on one of the following:
   on a longitudinal axis of the main panel, dividing the main panel into two substantially symmetrical halves;
   on the line of weakness between the main panel and the bottom closure panel;
   on a center point of the main panel;
   on the line of weakness between the main panel and the top closure panel;
   adjacent to the line of weakness between the main panel and the top closure panel.

3. The package material blank according to claim 1, wherein the first point and the third point are arranged on one of the following:
   on the lines of weakness between the main panel and the respective side panels;
   on respective corners defined by the main panel, the top closure panel and the respective side panels;
   on respective defined by the main panel, the bottom closure panel and the respective side panels.

4. The package material blank according to claim 1, wherein the first portion is symmetrical to the second portion with respect to an axis extending parallel to the lines of weakness between the main panel and the respective side panels and intersecting the second point.

5. The package material blank according to claim 1, further comprising
   a line of weakness extending from the second point to the fourth point parallel to the lines of weakness between the main panel and the respective side panels.

6. The package material blank according to claim 1 further comprising:
   a weakened area, which comprises a reduced thickness compared to a surrounding area of the package material laminate structure, wherein the weakened area is arranged on at least one of the following:
   on the main panel;
   on the top closure panel;
   adjacent to the line of weakness between the main panel and the top closure panel;
   adjacent to the line of weakness between the main panel and one of the side panels; and
   at least partly on the line of weakness between the main panel and the top closure panel.

7. The package material blank according to claim 6, wherein the multilayer material structure of the weakened area comprises fewer layers than the multilayer material structure of the surrounding area, and does not include the layer of cellulosic material.

8. The package material blank according to claim 6, wherein the first point of the line of weakness is intersecting with the weakened area.

9. The package material blank according to claim 6, wherein the multilayer material structure of the weakened area comprises an absence of the layer of cellulosic material.

10. The package material blank according to claim 1, wherein a middle area of the opening strip is arranged adjacent to the second point of the line of weakness.

11. The package material blank according to claim 1, wherein the opening device further comprises a support portion arranged on the first surface of the main panel adjacent to the opening strip, wherein the support portion is closer to the line of weakness between the main panel and the bottom closure panel than the opening strip.

12. The package material blank according to claim 11, wherein the support portion comprises a recess on its surface adjacent to the second point of the line of weakness.

13. The package material blank according to claim 1, further comprising an opening device that includes: a tab arranged on a first surface of the blank and an elongated opening strip arranged on a second surface opposite the first surface, and wherein the tab is connected to the opening strip portion via a bridge penetrating through the multilayer material structure in the weakened area, and the opening strip is substantially parallel to the line of weakness between the main panel and the top closure panel.

14. Package material blank comprising a multilayer material structure having a layer of cellulosic material and one or more layers of plastic laminate, the package material blank comprising:
   a body panel having a main panel, two side panels arranged on different sides adjacent to the main panel, and at least one third panel arranged adjacent to one of the side panels;
   end closure panels arranged adjacent to the body panel, the end closure panels comprising a top closure panel and a bottom closure panel arranged adjacent to the main panel and the at least one third panel, respectively and flap closure panels arranged adjacent to the two side panels;
   respective lines of weakness between each panel of the body panel and the end closure panels for folding the panels along said lines of weakness; and
   a line of weakness on the main panel having a first portion and a second portion, wherein the first portion extends from a first point to a second point and the second portion extends from a third point to the second point;
   an opening device having:
      a tab arranged on a first surface of the blank;
      an elongated opening strip arranged on a second surface opposite the first surface;
      the tab being connected to the opening strip portion via a bridge penetrating through the multilayer material structure in the weakened area;
      the opening strip being substantially parallel to the line of weakness between the main panel and the top closure panel; and
      a support portion arranged on the first surface of the main panel adjacent to the opening strip, wherein the support portion is closer to the line of weakness between the main panel and the bottom closure panel than the opening strip.

15. The package material blank according to claim 14, wherein ends of the opening strip are respectively arranged adjacent to first and third points of the line of weakness between the main panel and the top closure panel.

16. The package material blank of claim 14, wherein the second point is arranged on one of the following:
   on a longitudinal axis of the main panel, dividing the main panel into two substantially symmetrical halves;
   on the line of weakness between the main panel and the bottom closure panel;
   on a center point of the main panel;
   on the line of weakness between the main panel and the top closure panel;
   adjacent to the line of weakness between the main panel and the top closure panel.

17. The package material blank according to claim 14, wherein the first point and the third point are arranged on one of the following:
   on the lines of weakness between the main panel and the respective side panels;
   on respective corners defined by the main panel, the top closure panel and the respective side panels;
   on respective defined by the main panel, the bottom closure panel and the respective side panels.

18. The package material blank according to claim 14, wherein the first portion is symmetrical to the second portion with respect to an axis extending parallel to the lines of weakness between the main panel and the respective side panels and intersecting the second point.

19. The package material blank according to claim 14, further comprising
   a line of weakness extending from the second point to the fourth point parallel to the lines of weakness between the main panel and the respective side panels.

20. The package material blank according to claim 14, further comprising:
   a weakened area, which comprises a reduced thickness compared to a surrounding area of the package material laminate structure, wherein the weakened area is arranged on at least one of the following:
   on the main panel;
   on the top closure panel;
   adjacent to the line of weakness between the main panel and the top closure panel;
   adjacent to the line of weakness between the main panel and one of the side panels; and
   at least partly on the line of weakness between the main panel and the top closure panel.

21. The package material blank according to claim 14, wherein the support portion comprises a recess on its surface adjacent to the second point of the line of weakness.

* * * * *